United States Patent
Yeh et al.

(10) Patent No.: US 10,091,796 B2
(45) Date of Patent: Oct. 2, 2018

(54) COMMUNICATION METHOD AND SYSTEM

(71) Applicant: Intel Corporation, Santa Clara, CA (US)

(72) Inventors: Shu-Ping Yeh, New Taipei (TW); Ping Wang, Santa Clara, CA (US); Alexander W. Min, Portland, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 15/395,619

(22) Filed: Dec. 30, 2016

(65) Prior Publication Data

US 2018/0192425 A1    Jul. 5, 2018

(51) Int. Cl.
| | |
|---|---|
| *H04W 72/08* | (2009.01) |
| *H04W 72/04* | (2009.01) |
| *H04L 5/00* | (2006.01) |
| *H04W 74/06* | (2009.01) |
| *H04L 5/14* | (2006.01) |

(52) U.S. Cl.
CPC ......... *H04W 72/082* (2013.01); *H04L 5/0055* (2013.01); *H04L 5/14* (2013.01); *H04W 72/042* (2013.01); *H04W 72/0413* (2013.01); *H04W 74/06* (2013.01)

(58) Field of Classification Search
CPC . H04W 72/082; H04W 74/06; H04W 72/042; H04W 72/0413; H04L 5/14; H04L 5/0055
See application file for complete search history.

(56) References Cited

U.S. PATENT DOCUMENTS

| | | | |
|---|---|---|---|
| 2012/0020226 A1 | 1/2012 | Trainin | |
| 2012/0314594 A1* | 12/2012 | Mahadevappa | H04W 24/10 370/252 |
| 2016/0345278 A1* | 11/2016 | Chu | H04B 7/0417 |
| 2017/0155490 A1* | 6/2017 | Wang | H04L 5/0055 |

FOREIGN PATENT DOCUMENTS

| | | |
|---|---|---|
| EP | 2849527 A1 | 3/2015 |
| WO | 2015/039094 A1 | 3/2015 |
| WO | 2016/041205 A1 | 3/2016 |
| WO | 2016/153204 A1 | 9/2016 |

OTHER PUBLICATIONS

Search Report and Written Opinion for European Patent Application No. 17203933.1.

* cited by examiner

*Primary Examiner* — Thai Nguyen
(74) *Attorney, Agent, or Firm* — Schiff Hardin LLP

(57) ABSTRACT

Methods adapted for measuring interference in joint communications and Access Points (APs) are described. The interference can be between the AP and first and second communication stations (STAs). In a method to measure interference, a first communication between the AP and the first STA can be established. Further, a second communication between the AP and the second STA can be established. The second communication can include transmitting a null data packet (NDP) to the second STA based on the first communication to measure STA-to-STA inference between the first STA and the second STA.

17 Claims, 9 Drawing Sheets

COMMUNICATION METHOD AND SYSTEM

BACKGROUND

Field

Aspects described herein generally relate to joint download and upload transmissions, including half-duplex and full-duplex environments.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
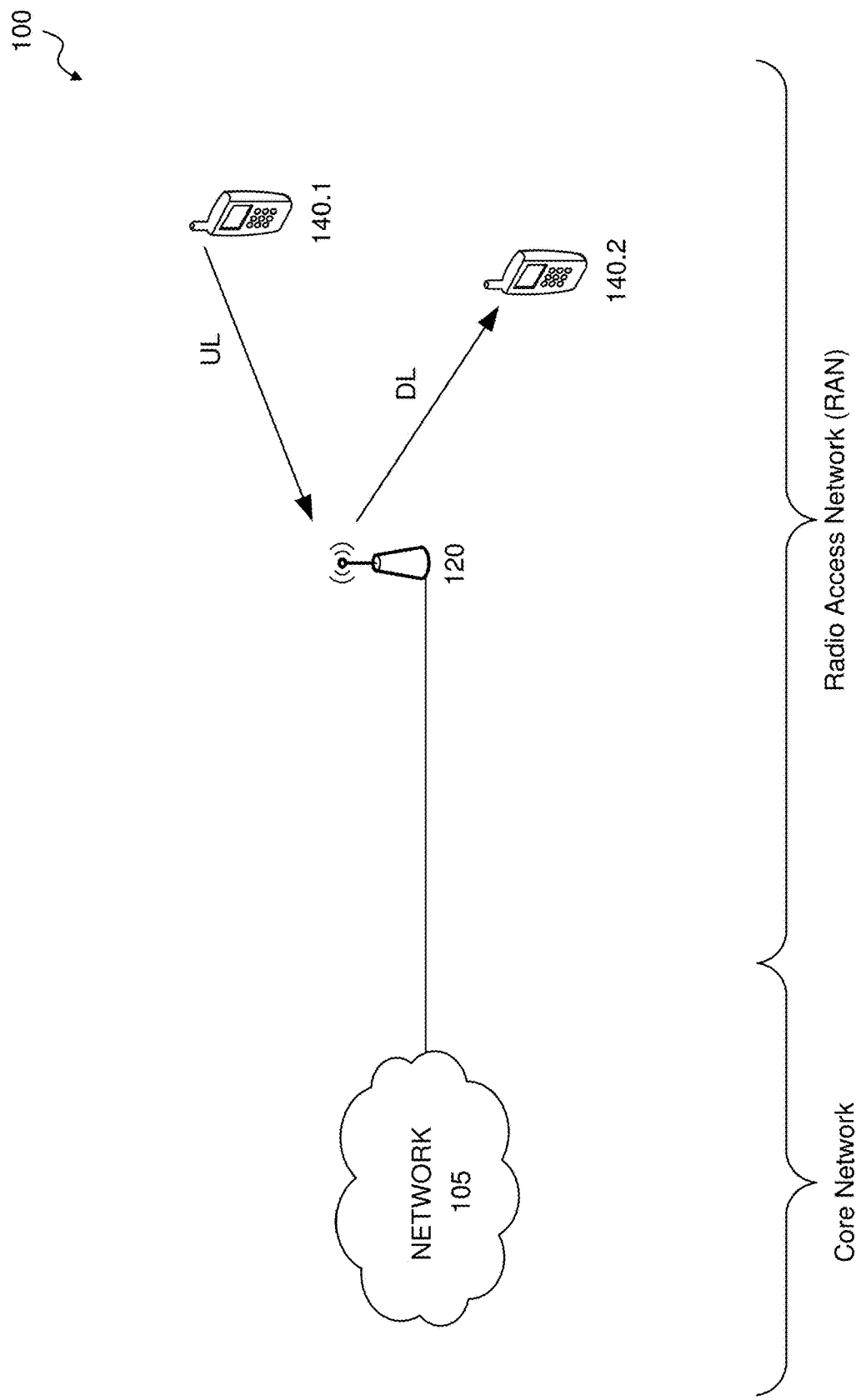
FIG. 1 illustrates an example communication environment.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, advancements in self-interference cancellation has enabled wireless devices to communicate in full-duplex (FD)—to transmit and receive simultaneously at the same frequency band. Due to strong transmission (Tx) echo, wireless devices can transmit and receive over orthogonal frequency/time resource. Advances in echo cancellation can now successfully suppress Tx echo, including by more than 120 dB, which allows wireless devices to decode received data even when the same frequency/time resource is used for transmission. Although the FD transmission capability can potentially double-up data throughput, it requires extensive media access control (MAC) protocol designs to maximize FD gain.

In exemplary aspects, the WiFi MAC protocol is configured to take advantage of FD capable devices, including in scenarios where a FD-capable WiFi access point (AP) communicates with legacy half-duplex (HD) WiFi stations (STAs) and/or where a HD WiFi AP communicates with a FD capable STA. For the sake of brevity, exemplary aspect will be described for FD-capable APs communicating with HD-capable STAs, but are not limited thereto and can also apply to FD-capable STAs communicating with HD-capable APs and/or HD-capable STAs, ad-hoc networks (e.g., STA to STA communications), relay networks such as WiFi Direct systems (e.g., AP communicates with an FD-STA, which forwards communications to another STA), and/or other configurations as would be understood by one of ordinary skill in the relevant arts.

In exemplary aspects, AP FD capability is exploited through simultaneous joint downlink (DL) and uplink (UL) transmission with a pair of STAs that include a DL STA and an UL STA, including measurement operations to measure STA-to-STA interference to determine FD-DL modulation and coding schemes (MCS) and the pairability of the DL and UL STAs.

Further, in exemplary aspects, interference measurement operations enable a FD AP to jointly schedule and measure DL and UL transmission of half-duplex WiFi STAs without requiring WiFi standard changes and/or non-standard signaling procedures. For example, exemplary aspects can be configured so as to not require media access control (MAC) protocol changes, one or more modified/non-standard management frames, and/or modified higher layer message exchange that may require AP and STA software/firmware modifications. As a result, exemplary aspects can advantageously utilize current and legacy WiFi devices.

In an exemplary aspect, the interference measurement operations measure STA-to-STA (also shortened as "STA-STA") interference information using null-data packets (NDP). For example, the AP can be configured to control or otherwise trigger one or more STAs to send a NDP so that the AP can measure one or more interference characteristics and/or one or more other wireless characteristics of one or more STAs.

Exemplary aspects can include, for example: the transmission of a NDP to a target STA during reception of DL ACK (from a STA that just successfully receives DL data); the transmission of a NDP to a target STA during UL data transmission (to avoid ACK for NDP interfering with UL ACK reception, NDP can be sent with ACK policy field set to Block ACK (BA)); AP be configured to combine Quality of Service (QoS) Contention-Free (CF) Polling & NDP transmission in DL and UL transmission to measure interference levels from UL STA to DL STA; and/or the aggregation of an NDP with other NDPs or data packets and transmission of such aggregated NDPs at different MCS levels to measure the FD-DL MCS level for a DL STA to be paired with a UL STA.

In exemplary aspects using NDP aggregation, the AP can be configured to send multiple NDPs with ACK policy field set to BA and in different FD-DL MCS levels during UL data transmission to determine one or more MCS for FD-DL transmission. Further, additional NDP with different MCS can be sent after FD-DL data packet to determine whether MCS for FD-DL transmission should be adjusted. Moreover, the AP can be configured to initiate NDP sounding procedure during UL data transmissions to determine beam direction adjustments when transmitting in FD-DL with an UL STA.

The present disclosure is directed to transmission procedures and interference measurement operations for joint DL-UL transmission for various types of WiFi STAs, including: non-quality of service (non-QoS) STA (i.e., legacy STAs capable of Institute of Electrical and Electronics Engineers' (IEEE) 802.1a/b/g); QoS STAs (STAs that also include functions set forth in IEEE 802.11e); and high throughput (HT) STAs (i.e., STAs that also include IEEE 802.11n or more advanced 802.11 capabilities). The present disclosure is not limited to these example types of STAs and can be other types of STAs having different wireless capabilities as would be understood by one of ordinary skill in the relevant arts.

The capability of WiFi STAs are defined as follows:

Non-QoS STA: The STA cannot support 802.11e but can support the 802.11a, 802.11b and/or 802.11g standard.

QoS STA: In addition to 802.11a, 802.11b and/or 802.11g, the STA can also support the 802.11e standard.

High throughput (HT) STA: In addition to 802.11a, 802.11b and/or 802.11g, the STA can also support 802.11n and 802.11e standard. The HT STA is also a QoS STA. In one or exemplary aspects, a HT STA can also support more advanced 802.11 standard(s), such as the 802.11ac, and/or one or more Wireless Gigabit Alliance (WiGig) protocols such as IEEE 802.11ad and IEEE 802.11ay.

FIG. 1 illustrates an example communication environment 100 that includes a radio access network (RAN) and a core network. The RAN includes a wireless access point (AP) 120 and two or more wireless stations (STAs) 140. The core network includes backhaul communication network 105 that is communicatively coupled to the AP 120. The backhaul communication network 105 can include one or more well-known communication components—such as one or more network switches, one or more network gateways, and/or one or more servers. The backhaul communication network 105 can include one or more devices and/or components configured to exchange data with one or more other devices and/or components via one or more wired and/or wireless communications protocols. In exemplary aspects, the AP 120 communicates with one or more service providers and/or one or more other APs 120 via the backhaul communication network 105. In an exemplary aspect, the backhaul communication network 105 is an internet protocol (IP) backhaul network.

In an exemplary aspect, the AP 120 can support one or more wireless communication protocols including, for example, wireless local access networks (WLAN) conforming to Institute of Electrical and Electronics Engineers' (IEEE) 802.11 Wi-Fi specification. In this example, the AP 120 can be referred to as a WLAN or WiFi Access Point (AP).

The AP 120 and STAs 140 are not limited to IEEE 802.11 protocols, and the AP 120 and STA 140 can support one or more other protocols in addition to (or in the alternative to) the IEEE 802.11 standards described herein as would be understood by one of ordinary skill in the relevant arts. Further, the number of APs 120, mobile devices 140, and/or networks 105 are not limited to the exemplary quantities illustrated in FIG. 1, and the communication environment 100 can include any number of the various components as would be understood by one of ordinary skill in the relevant art(s).

In operation, the STA 140 can be configured to wirelessly communicate with the AP 120. For example, the STA 140 receives signals on one or more downlink (DL) channels and transmits signals to the AP 120 on one or more respective uplink (UL) channels. As illustrated in FIG. 1, in an exemplary aspect, the AP 120 is a full-duplex (FD) capable AP and the STAs 140 are half-duplex (HD) capable STAs, where the FD AP 120 is configured to jointly schedule DL and UL transmission with HD STAs 140. Although examples are described that include a FD AP to HD STA relationship, it should be appreciated that the converse is also considered in the present disclosure, where the AP 120 is a HD AP while the STAs 140 are FD STAs.

In an exemplary aspect, the AP 120 and/or STAs 140 includes processor circuitry that is configured to control the corresponding device to communicate via one or more wireless technologies. The AP 120 and the STAs 140 can be configured to support HD and/or FD transmissions. The STAs 140 and the AP 120 can each include one or more transceivers configured to transmit and/or receive wireless communications via one or more wireless technologies within the communication environment 100.

Examples of the STA 140 include (but are not limited to) a mobile computing device—such as a laptop computer, a tablet computer, a mobile telephone or smartphone, a "phablet," a personal digital assistant (PDA), and mobile media player; an internet of things (TOT) device, and a wearable computing device—such as a computerized wrist watch or "smart" watch, and computerized eyeglasses. In one or more aspects of the present disclosure, the STA 140 may be a stationary device, including, for example, a stationary computing device—such as a personal computer (PC), a desktop computer, a computerized kiosk, and an automotive/aeronautical/maritime in-dash computer terminal, and/or a smart device/appliance—such as, for example, smart lighting device, smart door lock, smart home security system, smart refrigerator, etc.

Figure 2:
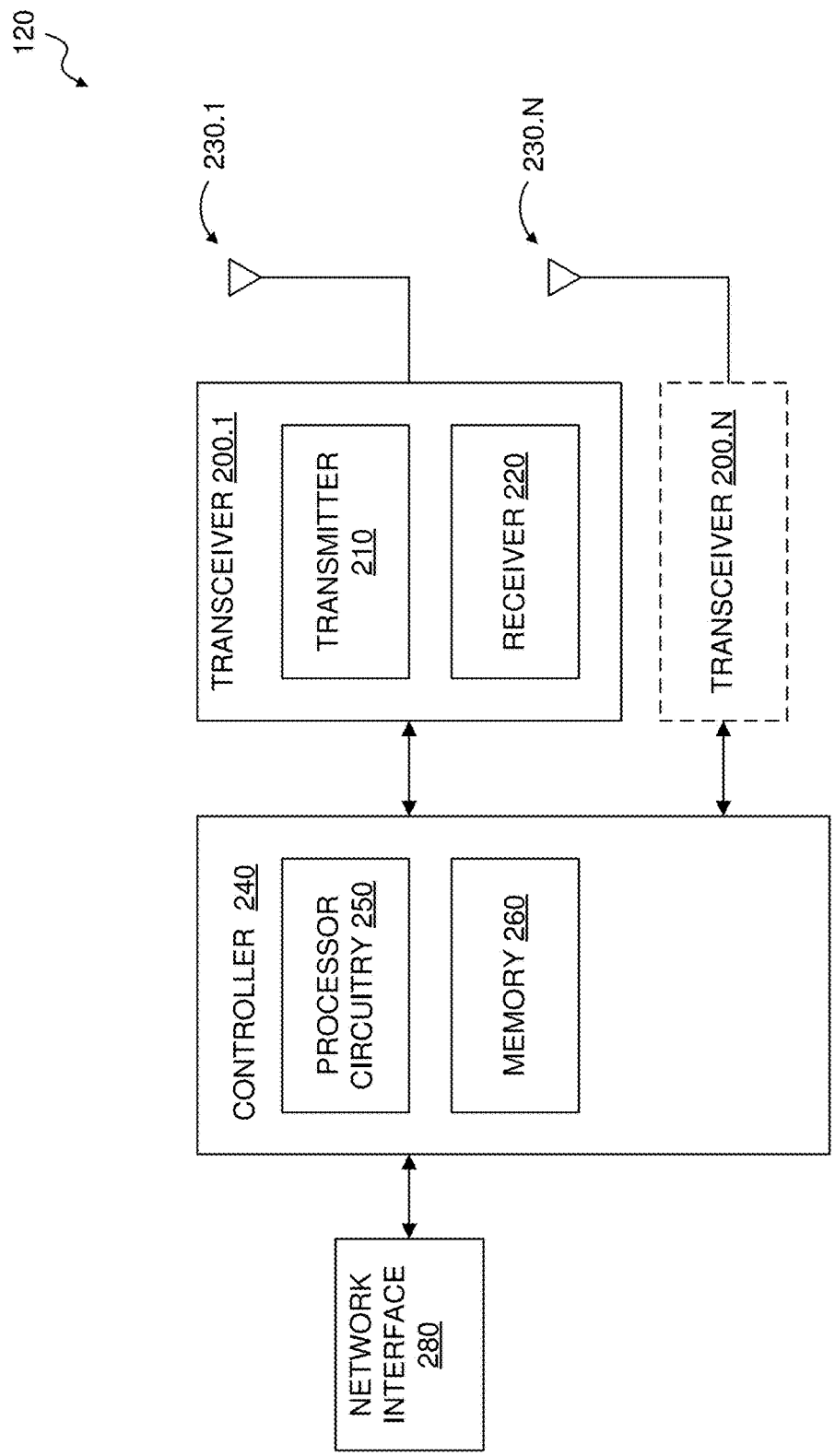
FIG. 2 illustrates an access point (AP) according to an exemplary aspect of the present disclosure.

FIG. 2 illustrates an exemplary aspect of the access point (AP) 120. For example, the AP 120 can include one or more transceivers 200 and a network interface 280, each communicatively coupled to controller 240. In an exemplary aspect, the AP 120 is a FD-capable WiFi AP configured to jointly communicate with two or more half-duplex (HD) WiFi stations (STAs) such as STAs 140. For example, the FD AP 120 is configured to perform concurrent/simultaneous joint downlink (DL) and uplink (UL) transmission with a pair of STAs 140, where one STA 140 is a DL STA and another STA 140 is an UL STA. The AP 120 is configured to jointly schedule DL and UL transmission of half-duplex WiFi STAs 140 without requiring WiFi standard changes and/or pre-decoding a MAC-header before receiving the entire packet (e.g., before receiving frame check sequence (FCS)).

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. In an exemplary For example, the transceiver 200 can include a transmitter 210 and receiver 220 that are configured for transmitting and receiving IEEE 802.11 communications via one or more antennas 235.

In an exemplary aspect, the transceiver 200 can be configured to support one or more wireless communication protocols including, for example, wireless local access networks (WLAN) conforming to the IEEE 802.11 Wi-Fi specification. One of ordinary skill in the relevant art(s) will understand that the transceiver 200 is not limited to IEEE 802.11 communications, and can be configured for communications that conform to one or more other protocols in addition (or in the alternative) to the IEEE 802.11 communications. In exemplary aspects where the AP 120 includes two or more transceivers 200, the transceivers 200 can be configured to communicate using the same or different communication protocols/standards.

Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the AP 120 can be configured for wireless communication utilizing a Multiple-input Multiple-output (MIMO) configuration.

The network interface 280 includes processor circuitry that is configured to transmit and/or receive communications via one or more wired technologies to/from the backhaul communication network 105. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the AP 120, and/or one or more components of the AP 120 such as the transceiver 200 and/or network interface 280. The processor circuitry 250 can be configured to perform one or more interference measurement operations, including joint DL-UL interference measurement operations, and/or control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.); and/or to the operation of the network interface 280 including, for example, transmitting and/or receiving of wired and/or wireless communications via the network interface 280, and/or perform one or more baseband processing functions (e.g., media access control (MAC), encoding/decoding, modulation/demodulation, data symbol mapping, error correction, etc.).

The controller 240 can further include a memory 260 that stores data and/or instructions, where when the instructions are executed by the processor circuitry 250, controls the processor circuitry 250 to perform the functions described herein. In an exemplary aspect, the memory 260 stores interference measurement information obtained from one or more interference measurement operations.

The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

As described in more detail below, in exemplary aspects, the controller 240 is configured to perform FD-capable communications. The controller 240 can be configured to control the AP 120 to communicate with two or more HD WiFi STAs such as STAs 140. In an exemplary aspect, the controller 240 is configured to perform simultaneous joint DL and UL transmission via the transceiver 200 with a pair of STAs 140, where one STA 140 is a DL STA and another STA 140 is an UL STA. The controller 240 is configured to jointly schedule DL and UL transmission of half-duplex WiFi STAs 140 without requiring WiFi standard changes and/or pre-decoding a MAC-header before receiving the entire packet (e.g., before receiving frame check sequence (FCS)).

In an exemplary aspect, the controller 240 is configured to perform one or more interference measurement operations, including joint DL-UL interference measurement operations to determine FD-DL MCS and/or the pairability of the DL and UL STAs 140 communicating with the AP 120. Operations of the controller 240 according to exemplary aspects are described with reference to FIGS. 4-10 below.

Figure 3:
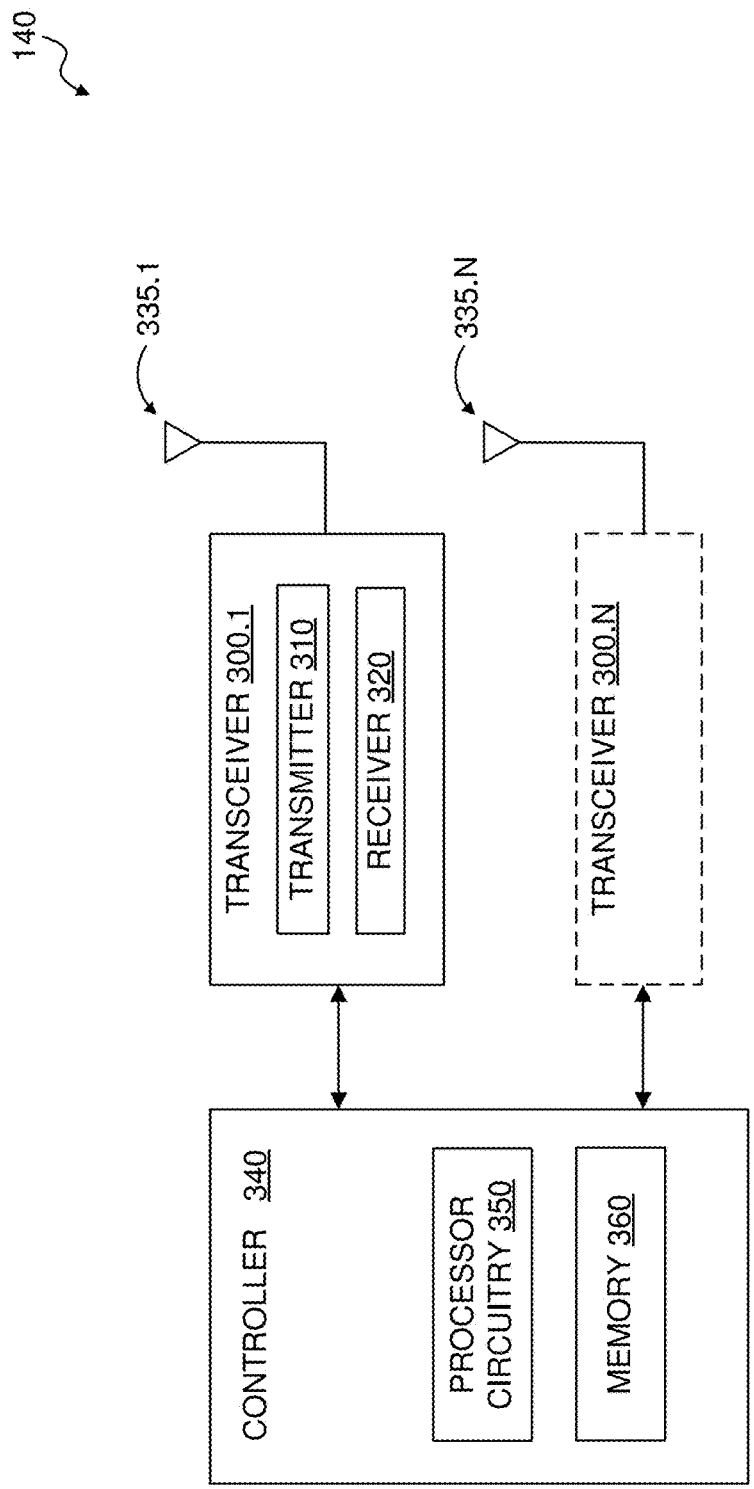
FIG. 3 illustrates a communication station (STA) according to an exemplary aspect of the present disclosure.

FIG. 3 illustrates an exemplary aspect of a STA 140. The STA 140 can include controller 340 communicatively coupled to one or more transceivers 300 configured to transmit and/or receive wireless communications via one or more wireless technologies within the communication environment 100.

The transceiver(s) 300 can each include processor circuitry that is configured for transmitting and/or receiving wireless communications conforming to one or more wireless protocols. For example, the transceiver 300 can include a transmitter 310 and receiver 320 that are configured for transmitting and receiving IEEE 802.11 communications via one or more antennas 335.

The transceiver 300 can include a transmitter 310 and receiver 320 that are configured for transmitting and receiving IEEE 802.11 communications, respectively, via one or more antennas 335. In this example, the transceiver 300 can be referred to as WLAN or Wi-Fi transceiver 300. Those skilled in the relevant art(s) will understand that the transceiver 300 is not limited to WLAN communications, and can be configured for communications that conform to one or more other protocols in addition (or in the alternative) to the IEEE 802.11 communications.

In exemplary aspects, the transceiver(s) 300 can each include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The controller 340 can include processor circuitry 350 that is configured to control the overall operation of the STA 140, such as the operation of the transceiver 300—including, for example, transmitting and/or receiving of wireless communications via the transceivers 300, perform one or more baseband processing functions (e.g., media access control (MAC), encoding/decoding, modulation/demodulation, data symbol mapping, error correction, etc.); perform one or more interference estimations; the running of one or more applications and/or operating systems; power management (e.g., battery control and monitoring); display settings; volume control; and/or user interactions via one or more user interfaces (e.g., keyboard, touchscreen display, microphone, speaker, etc.).

The controller 340 can further include a memory 360 that stores data and/or instructions, where when the instructions are executed by the processor circuitry 350, controls the processor circuitry 350 to perform the functions described herein. In an exemplary aspect, the memory 360 can store interference measurement information obtained from one or more interference measurement operations. The memory 360 can be any well-known volatile and/or non-volatile memory, and can be non-removable, removable, or a combination of both.

In an exemplary aspect, the STA 140 is a HD capable STA, and the processor circuitry 350 is configured to control the STA 140 to communication with a FD capable AP 120. Although exemplary aspects are discussed for HD STA and FD AP configurations, the STA 140 can be configured for the converse operation (FD STA and HD AP/STA) when the STA is a FD STA communicating with a HD AP and/or a FD AP. The STA 140 can be one of a pair of STAs simultaneously communicating with the AP 120, where one STA 140 is a DL STA and another STA 140 is an UL STA.

In one or more exemplary aspects, a list of pair-able DL STAs for an UL STA and the corresponding FD-DL data rate are available at the AP. Procedures to identify pair-able DL-STA and UL-STA can include, for example, using past joint transmission success rates, sending test-purpose measurement packets, and/or one or more other operations as would be understood by one of ordinary skill in the art.

In a joint DL-UL transmission, the AP 120 can be configured to determine the pairability between DL and UL STAs and the MCS level for FD-DL transmission using long-term ACK/NAK information. For example, in a transmission sequence of joint DL-UL transmission, the AP 120 can determine whether the MCS-level selected for FD-DL transmission can be supported by monitoring the ACK from DL STA.

In this example, the FD-DL MCS is determined through multiple attempts to pair with the same UL STA. The measurement generally occurs during joint DL-UL transmissions that use DL packet sizes that are short enough for DL-UL transmission time alignment. Further, in this example, the AP 120 may be unaware of the strength of the interference the DL STA is causing to the UL STA.

Figure 4:
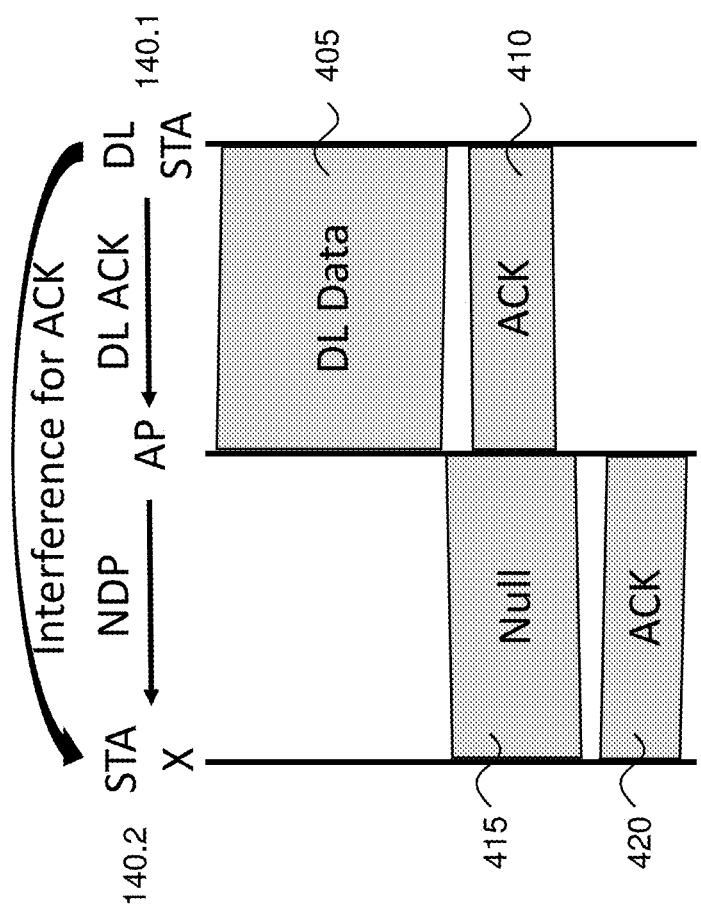
FIGS. 4-6 illustrate joint downlink (DL)-uplink (UL) transmission interference measurement operations according to exemplary aspects of the present disclosure.
Figure 5B:
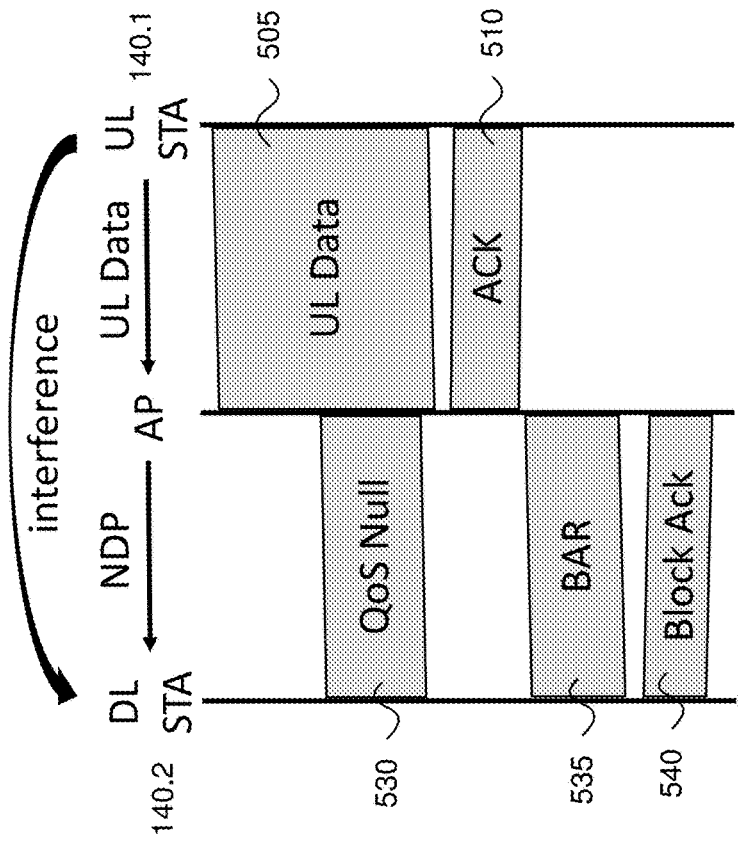
Figure 5A:
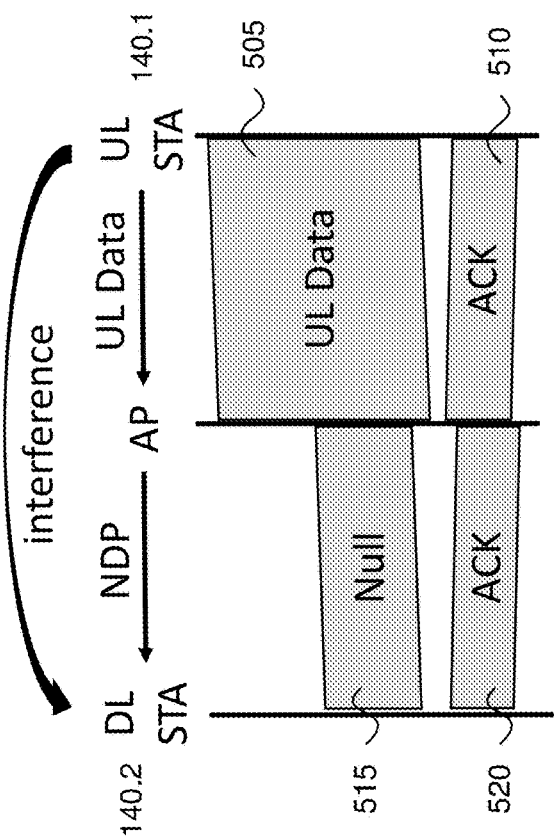
Figure 6:
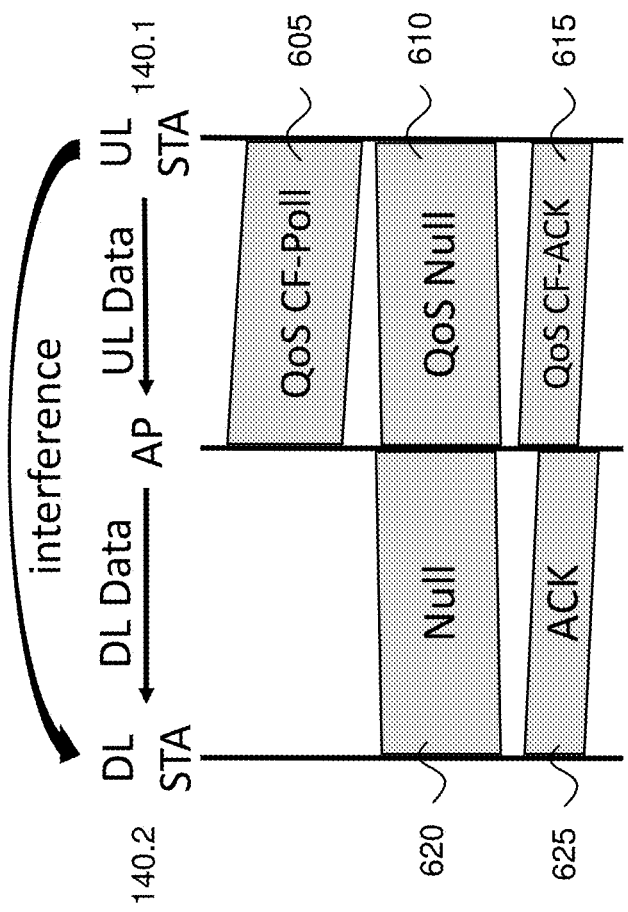

FIGS. 4-6 illustrate joint downlink (DL)-uplink (UL) transmission interference measurement operations according to exemplary aspects of the present disclosure.

Transmission of NDP during DL ACK

In an exemplary aspect, the AP 120 can be configured to perform DL-UL interference measurement operations to determine the pairability of two or more STAs 140 that are jointly communicating with the AP 120. In an exemplary aspect, the AP 120 can be configured to send one or more null data packets (NDPs) to a STA 140 (e.g. probe the pairability between the two STAs 140) to measure the DL-UL interference of the STAs 140 communicating with the AP 120. In this example, the AP 120 can adjust the MCS levels for the transmissions of the NDPs. The MCS level for the NDP transmission can be based on the APs 120 knowledge of the STA-to-STA interference level.

With reference to FIG. 4, AP 120 is communicating with the DL STA 140.1. In an exemplary aspect, the AP 120 is configured to determine whether a target STA X 140.2 can be paired for DL transmission when the current DL STA 140.1 is transmitting to the AP 120 in the UL.

In an exemplary aspect, the AP 120 is configured to send a NDP 415 to the target STA X 140.2 during the DL acknowledgment (ACK) 410 being transmitted in the UL to the AP 120 from the DL STA 140.1. In this example, the ACK 410 is acknowledging the DL data 405 that has been sent from the AP 120 to the DL STA 140.1.

In operation, the AP 120 can measure the interference between the DL STA 140.1 and the target STA 140.2 using the transmission of the NDP to the STA X 140.2 during DL ACK transmission 410 from the DL STA 140.1. In this example, the AP 120 can be configured to detect whether STA X 140.2 replies with an ACK in response to the NDP 415. Based on this detection, the AP 120 can determine if the two STAs 140.2 and 140.1 should be paired as (FD-DL, FD-UL) STAs for joint DL-UL transmission with the AP 120. In an exemplary aspect, the STA X 140.2 can be configured such that the STA 140.2 continues to monitor the channel and continues to receive packets after decoding and determining that it is not the recipient of the DL data packet 405.

In an exemplary aspect, the AP 120 can be configured to adjust the MCS level of the NDP 415. For example, the AP 120 can set the MCS level of the NDP 415 to the lowest MCS level (e.g., MCS(0)), but is not limited thereto. In this example, the NDP 415 at MCS(0) can be used to determine whether concurrent ACK transmission can be supported when the AP 120 transmits data in DL to STA 140.1 jointly with the target STA X 140.2 as the UL STA. In operation, by utilizing the NDP operation, the AP 120 can determine if the STA X 140.2 can decode the ACK from the AP 120 while DL STA 140.1 transmits ACK to AP 120.

Although FIG. 4 illustrates that STA 140.1 is a DL STA and STA X 140.2 is an UL STA, the AP 120 can be configured to communicate with the STA 140.2 operating as a DL STA while STA 140.1 is an UL STA. This configuration is illustrated in FIG. 5A, and described below.

Transmission of NDP in DL during Short UL

Turning to FIG. 5A, the AP 120 can be configured to send one or NDPs 515 to a DL STA 140.2 while the AP 120 is receiving an UL data packet 505 is being received from UL STA 140.1 to measure the UL-DL interference of the STAs 140.1 and 140.2 communicating with the AP 120. In this example, the AP 120 is configured to communicate with the STA 140.2 (STA X from FIG. 4) operating as a DL STA while STA 140.1 is an UL STA (DL STA in FIG. 4) as described above with reference to FIG. 4. In this exemplary aspect, the AP 120 can be configured to determine if the DL STA 140.2 can be paired with the UL STA 140.1 in FD-DL when the UL STA 140.1 is sending data (UL data 505) by sending the NDP 515 during the UL data 505 reception.

With reference to FIG. 5B, in an exemplary aspect where the AP 120 is a QoS STA or HT STA (e.g., configured for IEEE 802.11e and above) and is uncertain whether transmission of the target STA 140.2 may impact UL ACK reception, the AP 120 can be configured to use a delayed Block ACK to orthogonlize the ACK transmission 510 from the AP 120 and the ACK from the target STA 140.2. For example, this operation can be used to measure the UL-DL interference if the AP 120 has previously not performed a transmission of a NDP to the STA 140.1 during a DL ACK transmission from a DL STA 140.2 (e.g., the operation illustrated in FIG. 4), and/or if such an operation has been performed but the AP 120 has not successfully received a DL ACK (e.g., ACK 420 in FIG. 4) in response to a NDP (e.g., 415 in FIG. 4).

In an exemplary aspect, the AP 120 is configured to transmit a QoS NDP 530 to the DL STA 140.2. The AP 120 can then transmit a block ACK request (BAR) 535 to the DL STA 140.2 after transmitting the UL ACK 510 to the UL STA 140.1. In response to the BAR 535, the DL STA 140.2 can transmit a Block ACK 540. In this example, the AP 120 can reduce and/or eliminate the possibility that the UL transmission will be interfered with by the STA-to-STA interference measurement procedure (e.g., by the QoS NDP 530 operation).

Transmission of QoS CF-Poll to Trigger Concurrent DL-UL NDP

Turning to FIG. 6, the AP 120 can be configured to use QoS Contention-Free (CF)-Polling to trigger concurrent DL-UL NDP transmission. In an exemplary aspect, the AP 120 can be configured to transmit a QoS CF-Poll packet 605 to the UL STA 140.1 to trigger the UL STA 140.1 to respond with QoS NDP 610. In an exemplary aspect, the AP 120 can configure the QoS CF-Poll to specify a Transmission Opportunity (TxOP) duration that is too short to support data transmission but long enough for transmitting a QoS null packet (e.g., QoS NDP 610) and the following ACK (e.g., QoS CF-ACK 615).

After transmitting the QoS CF-Poll packet 605, the AP 120 can transmit a NDP 620 to the DL STA 140.2 as the QoS NDP 610 is being received by the AP 120. As the QoS NDP 610 will be transmitting at the same time by the UL STA 140.1, the DL STA 140.2 will only reply with ACK 625 if the NDP 620 from the AP 120 can be successfully decoded by the DL STA 140.2. This transmission sequence can be used by the AP to quickly test the pair-ability of arbitrary UL and DL STAs.

Aggregation of NDP for FD-DL MCS Rate Adaption

The AP 120 can be configured to aggregate QoS NDPs at different MCS levels with one or more other QoS NDPs and/or other data. In an exemplary aspect, the AP 120 can aggregate QoS NDPs when the target DL STA is a QoS STA or HT STA (e.g., configured for IEEE 802.11e or above), but is not limited thereto.

Figure 7:
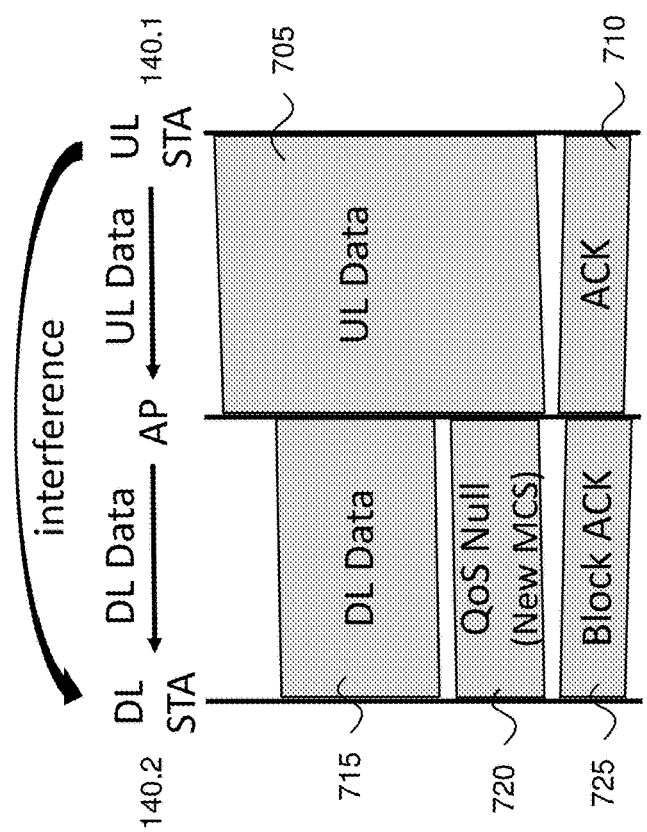

As illustrated in FIG. 7, in an exemplary aspect, when FD-DL transmission (e.g., DL data 715) ends before FD-UL transmission (e.g., UL data 705), and the remaining transmission time for the UL data 705, one or more additional QoS NDPs 720 can be aggregated with the DL data 715.

For example, the AP 120 can be configured to transmit the DL data 715 with a delayed block ACK (e.g., ACK policy field set to BA), and transmit one or more QoS NDPs 720 at different MCS levels with the ACK policy field of the last QoS NDP set to Normal ACK. In this example, the DL data 715 can be sent with the MCS level from a previous measurement (or the initial MCS level if the current transmission is the first measurement).

In an exemplary aspect, the AP 120 can be configured to determine which MCS level can be supported when the DL STA 140.2 is paired with the UL STA 140.1 as a FD-DL STA based on the Block ACK message 725 transmitted to the AP 120 by the DL STA 140.2 in response to the QoS NDP(s) 720. In an exemplary aspect, the Block ACK 725 includes a bitmap that acknowledges the DL data 715 and the one or more QoS NDPs 720 with different MCS levels.

In an exemplary aspect, using the aggregation of QoS NDPs, the AP 120 can determine which MCS level can be supported for FD-DL transmission, and enable an increased FD-DL rate adaption by the AP 120.

Figure 8:
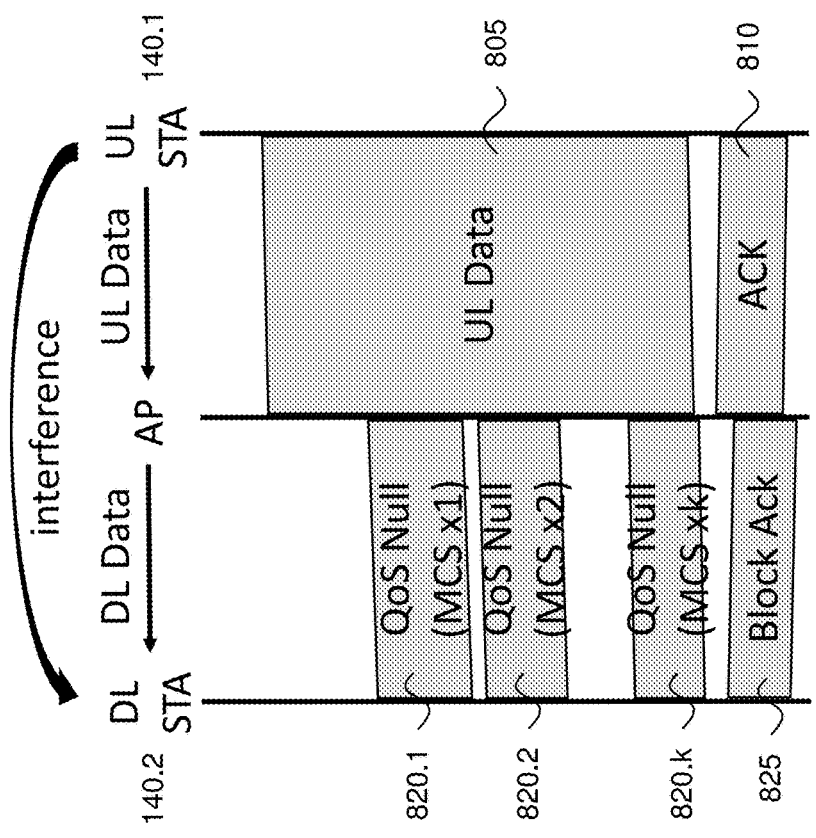
FIGS. 7-9 illustrate joint DL-UL transmission interference measurement operations including modulation and coding scheme (MCS) determinations according to exemplary aspects of the present disclosure.

Turning to FIG. 8, the AP 120 can be configured to aggregate QoS NDPs 820.1 to 820.k at different MCS levels when the AP 120 is not transmitting DL data to the DL STA 140.2. In an exemplary aspect, the AP 120 can aggregate QoS NDPs when the target DL STA is a QoS STA or HT STA (e.g., configured for IEEE 802.11e or above), but is not limited thereto.

For example, while the AP 120 is receiving UL data 805 from the UL STA 140.1, the AP 120 can transmit one or more QoS NDPs 820 (e.g., 820.1 to 820.k) having different MCS levels 1 to k. In this example, the QoS NDPs 820.1 and 820.2 can have their respective ACK policy fields set to BA while the ACK policy field of the last QoS NDP 820.k is set to Normal ACK.

In an exemplary aspect, the AP 120 is configured to analyze the Block ACK message 825 to determine which FD-DL MCS levels are supportable for the pairing of the DL STA 140.2 and the UL STA 140.1. In this example, the Block ACK 825 can include a bitmap that acknowledge the QoS NDP(s) 820 of different MCS levels.

Figure 9:
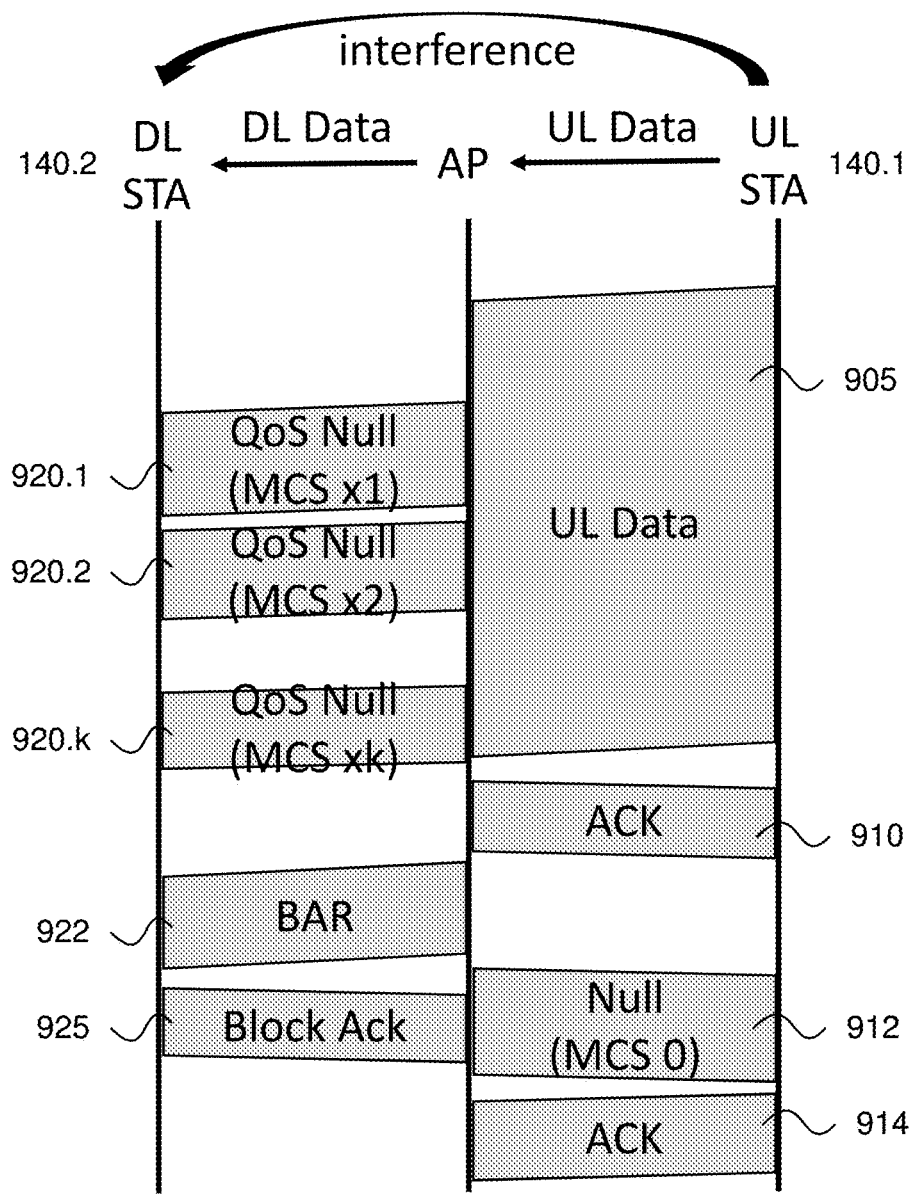

FIG. 9 illustrates a similar aggregation of QoS NDPs as described with reference to FIG. 8, but the AP 120 is configured to transmit a block ACK request (BAR) 922 to the DL STA 140.2 after transmitting the UL ACK 910 to the UL STA 140.1. This operation can be used to reduce and/or avoid concurrent UL and DL ACK. In this example, the AP 120 can reduce and/or eliminate the possibility that the UL transmission will be interfered with by the STA-to-STA interference measurement procedure.

In an exemplary aspect, while the AP 120 is receiving UL data 905 from the UL STA 140.1, the AP 120 can transmit one or more QoS NDPs 920 (e.g., 920.1 to 920.k) having different MCS levels 1 to k. Different from the aspect illustrated in FIG. 8, the QoS NDPs 920.1 to 920.K have their respective ACK policy fields set to BA. In this example, because of the last QoS NDP 920.k having its ACK policy set to Block ACK, the DL STA 140.2 will wait to send the Block ACK 925 until either the AP 120 sends BAR 922 or a new packet (e.g. new QoS NDP having its ACK policy set to Normal ACK).

The AP 120 is configured to then transmit a block ACK request (BAR) 922 to the DL STA 140.2 after transmitting the UL ACK 910 to the UL STA 140.1.

In an exemplary aspect, the AP 120 can also utilize the NDP transmissions to the UL STA similar to the aspects described above with respect to, for example, FIGS. 4-6. For example, the AP 120 can be configured to transmit a NDP 912 (at a MCS level of, for example, MCS level 0) to the UL STA 140.1 during the reception of the Block ACK 925 from the DL STA 140.2 to determine interference characteristics for both the FD-DL MCS level and whether orthogonal ACK transmission should be used when the UL STA 140.1 and the DL STA 140.2 are paired together for joint transmission.

Joint DL-UL TX Interference Measurements Include Channel Sounding

Figure 10:
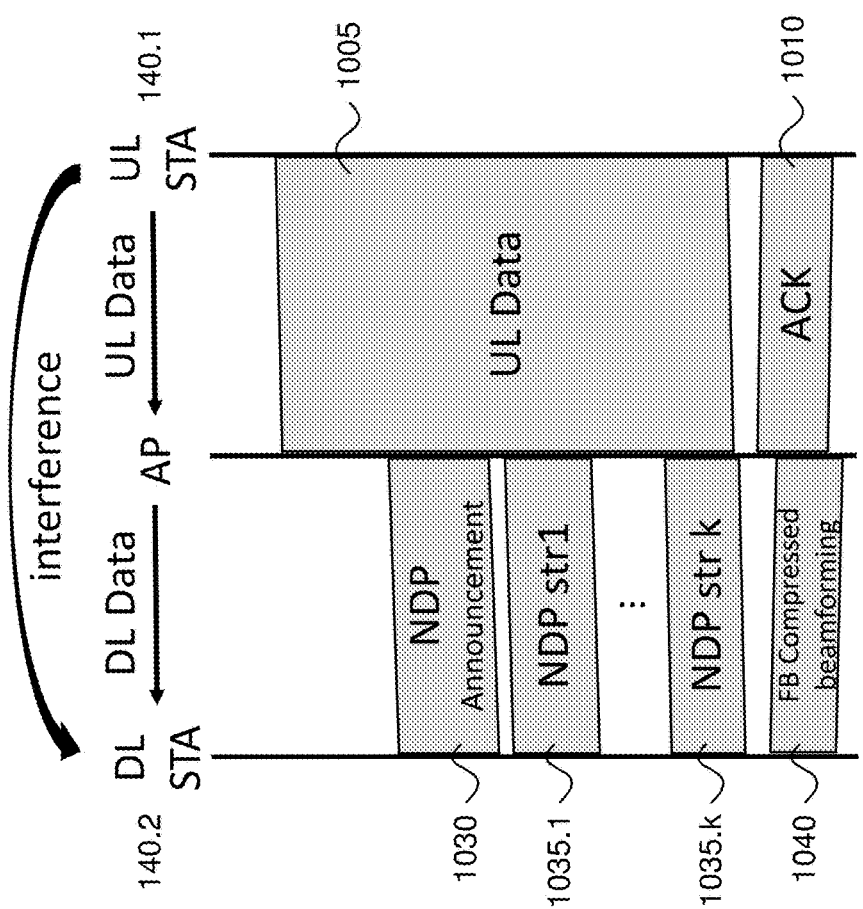
FIG. 10 illustrates joint DL-UL transmission interference measurement operations including beamforming channel sounding according to exemplary aspects of the present disclosure.

FIG. 10 illustrates joint DL-UL transmission interference measurement operations including beamforming channel sounding according to exemplary aspects of the present disclosure.

In an exemplary aspect, for HT DL STAs 140.2 (e.g., STAs configured for IEEE 802.11n and above), when the UL transmission 1005 is of sufficient duration and the AP 120 has previously determined that MCS level 0 is supportable for FD-DL transmission, the AP 120 can be configured to trigger a NDP sounding procedure.

In an exemplary aspect, the AP 120 can be configured to perform a NDP sounding procedure if the AP 120 can ensure the sounding report happens after UL data transmission 1005.

As illustrated in FIG. 10, while the AP 120 is receiving UL data 1005 from the UL STA 140.1, the AP 120 can transmit a NDP announcement 1030 (e.g., NDP announcement packet or frame) following by one or more QoS NDPs 1035 (e.g., 1035.1 to 10.5.k), where each of the QoS NDPs 1035 are transmitted from a different antenna of the AP 120. The AP 120 can then receive feedback (FB) compressed beamforming information 1040 from the DL STA 140.2 that includes information on the transmission direction to be used by the AP 120 (e.g., what antenna weights the AP 120 should apply to the DL transmissions).

EXAMPLES

Example 1 is a method adapted for measuring interference in joint communications between an access point (AP) and first and second communication stations (STAs), the method comprising: establishing a first communication between the AP and the first STA; and establishing a second communication between the AP and the second STA comprising transmitting a null data packet (NDP) to the second STA based on the first communication to measure STA-to-STA inference between the first STA and the second STA.

In Example 2, the subject matter of Example 1, wherein the NDP is transmitted from the AP to the second STA while the AP receives an acknowledgment from the first STA via the first communication.

In Example 3, the subject matter of Example 2, wherein the first communication comprises: transmitting, by the AP, data to the first STA, wherein the acknowledgement from the first STA acknowledges receipt of the data.

In Example 4, the subject matter of Example 1, wherein: the first communication comprises receiving, by the AP, data from the first STA; and the second communication comprises transmitting, by the AP, the NDP to the second STA while receiving the data from the first STA.

In Example 5, the subject matter of Example 4, wherein: the first communication further comprises transmitting, by the AP, a first acknowledgment to the first STA in response to the received data; and the second communication further comprises receiving, by the AP, a second acknowledgment from the second STA in response to the NDP.

In Example 6, the subject matter of Example 5, wherein the first acknowledgment is transmitted while receiving the second acknowledgment.

In Example 7, the subject matter of Example 4, wherein the second communication comprises: transmitting, by the AP, a block acknowledgment request (BAR) to the second STA for the NDP; and receiving, by the AP, a block acknowledgment (BA) in response to the BAR.

In Example 8, the subject matter of Example 7, wherein the first communication comprises: transmitting, by the AP, an acknowledgment to the first STA in response to the received data, wherein the BAR is transmitted by the AP after the acknowledgment is transmitted to the first STA.

In Example 9, the subject matter of Example 1, wherein the first communication comprises: transmitting, by the AP, a quality of service (QoS) Contention-Free (CF) Polling packet to the first STA to trigger the first STA to transmit a quality of service null data packet (QoS NDP) to the AP.

In Example 10, the subject matter of Example 9, wherein the NDP is transmitted by the AP via the second communication while the AP receives the QoS NDP.

In Example 11, the subject matter of Example 1, wherein: the second communication comprises transmitting, by the AP, one or more other NDPs to the second STA; the one or more other NDPs are aggregated with the NDP; and the NDP and each of the one or more other NDPs have different modulation and coding scheme (MCS) levels.

In Example 12, the subject matter of Example 11, wherein: an acknowledgement policy of a last of the one or more other NDPs is set to a normal acknowledgment while acknowledgement policies of the NDP and remaining NDPs of the one or more other NDPs are set to block acknowledgment; and the first communication comprises transmitting, by the AP, an acknowledgment to the first STA while receiving a block acknowledgment (BA) from the second STA in response to the last of the one or more other NDPs.

In Example 13, the subject matter of Example 11, wherein: acknowledgement policies of the NDP and the one or more other NDPs are set to block acknowledgment; the second communication further comprises transmitting, by the AP, a block acknowledgment request (BAR) to the second STA and receiving, by the AP, a block acknowledgment (BA) in response to the BAR; and the first communication comprises transmitting, by the AP, a null data packet to the first STA while receiving the BA from the second STA.

In Example 14, the subject matter of Example 13, wherein: the first communication comprises receiving, by the AP, data from the first STA while the AP transmits the NDP and the one or more other NDPs, and transmitting an acknowledgement to the first STA to acknowledge the received data; and the BAR is transmitted to the second STA after the AP transmits the acknowledgment to the first STA.

In Example 15, the subject matter of Example 4, wherein: the second communication further comprises transmitting, by the AP, data to the second STA while receiving the data from the first STA; and the NDP is aggregated with the data transmitted to the second STA.

In Example 16, the subject matter of Example 1, wherein the AP is configured to communicate in a full-duplex operation and the first and the second STAs are configured to communicate in a half-duplex operation.

Example 17 is an access point (AP) adapted to measure interference in joint communications between the AP and first and second communication stations (STAs), comprising: a transceiver configured to communicate with the first and the second STAs; and a controller coupled to the transceiver and is configured to: establish a first communication between the AP and the first STA using the transceiver; and establish a second communication between the AP and the second STA using the transceiver, the second communication comprising transmitting a null data packet (NDP) to the second STA based on the first communication to measure STA-to-STA inference between the first STA and the second STA.

In Example 18, the subject matter of Example 17, wherein: the first communication comprises transmitting data from the AP to the first STA and receiving an acknowledgment from the first STA that acknowledges the transmitted data; and the controller is configured to transmit the NDP while receiving the acknowledgment from the first STA.

In Example 19, the subject matter of Example 17, wherein: the first communication comprises receiving data from the first STA and transmitting an acknowledgment to the first STA to acknowledge the received data; the second communication further comprises receiving an acknowledgment from the second STA in response to the NDP; and the controller is configured to transmit the NDP while receiving the data from the first STA and transmit the acknowledgment to the first STA while receiving the acknowledgment from the second STA.

In Example 20, the subject matter of Example 17, wherein: the first communication comprises receiving data from the first STA and transmitting an acknowledgment to the first STA to acknowledge the received data; and the controller is further configured to: transmit the NDP while receiving the data from the first STA; transmit a block acknowledgment request (BAR) to the second STA via the second communication for the NDP; and receive a block acknowledgment (BA) in response to the BAR.

In Example 21, the subject matter of Example 17, wherein the controller is further configured to: transmit one or more other NDPs to the second STA via the second communication; aggregate the one or more other NDPs with the NDP; and set the NDP and each of the one or more other NDPs to have different modulation and coding scheme (MCS) levels.

In Example 22, the subject matter of Example 17, wherein: the first communication comprises receiving data from the first STA and transmitting an acknowledgment to the first STA to acknowledge the received data; the second communication further comprises transmitting, by the AP, data to the second STA while receiving the data from the first STA; and the controller is further configured to aggregate the NDP with the data transmitted to the second STA.

Example 23 is an access point (AP) adapted to measure interference in joint communications between the AP and first and second communication stations (STAs), comprising: a transceiver configured to communicate with the first and the second STAs; and a controller coupled to the transceiver and is configured to: establish a first communication between the AP and the first STA using the transceiver, the first communication comprising transmitting a quality of service (QoS) Contention-Free (CF) Polling packet to the first STA to trigger the first STA to transmit a quality of service null data packet (QoS NDP) to the AP; and establish a second communication between the AP and the second STA using the transceiver, the second communication comprising transmitting a null data packet (NDP) to the second STA based on the first communication to measure STA-to-STA inference between the first STA and the second STA.

In Example 24, the subject matter of Example 23, wherein the controller is configured to transmit the NDP while receiving the QoS NDP from the first STA.

In Example 25, the subject matter of Example 23, wherein the controller is further configured to: receive an acknowledgment from the second STA in response to the NDP; and transmit an acknowledgment to the first STA in response to the QoS NDP.

In Example 26, the subject matter of any of Examples 1-15, wherein the AP is configured to communicate in a full-duplex operation and the first and the second STAs are configured to communicate in a half-duplex operation.

Example 27 is a computer program product embodied on a computer-readable medium comprising program instructions, when executed, causes a processor to perform the method of any of claims 1-16.

Example 28 is an apparatus comprising means to perform the method as claimed in any of claims 1-16.

Example 29 is an apparatus of a wireless communication device, the apparatus comprising means to perform the method as claimed in any of claims 1-16.

Example 30 is an apparatus comprising processor circuitry configured to perform the method as claimed in any of claims 1-16.

Example 31 is a wireless access point comprising means to perform the method as claimed in any of claims 1-16.

Example 32 is an apparatus substantially as shown and described.

Example 33 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to the IEEE 802.11 standards. The exemplary aspects can be applied to other wireless communication protocols/standards including (but not limited to) Long-Term Evolution (LTE) and/or, LTE Advanced, one or more fifth generation (5G) communications, Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX) IEEE 802.16), and/or one or more cellular communications using one or frequency bands of the industrial, scientific and medical (ISM) radio bands to provide some examples. Further, exemplary aspects are not limited to cellular communication networks and can be used or implemented in other kinds of wireless communication access networks, including (but not limited to) Bluetooth, Near-field Communication (NFC) (ISO/IEC 18092), ZigBee (IEEE 802.15.4), Z-Wave, Radio-frequency identification (RFID), and/or one or more non-cellular communications using one or frequency bands of the ISM radio bands to provide some examples.

What is claimed is:

1. A method adapted for measuring interference in joint communications between an access point (AP) and first and second communication stations (STAs), the method comprising:
   establishing a first communication between the AP and the first STA, the first communication comprising receiving data from the first STA and transmitting a first acknowledgment to the first STA to acknowledge the received data; and
   establishing a second communication between the AP and the second STA to measure STA-to-STA inference between the first STA and the second STA, the second communication comprising transmitting a null data packet (NDP) to the second STA based on the first communication while the data is received from the first STA, and receiving a second acknowledgment from the second STA in response to the NDP while the first acknowledgment is transmitted to the first STA.

2. The method of claim 1, wherein the second communication further comprises:
   transmitting, by the AP, a block acknowledgment request (BAR) to the second STA for the NDP; and
   receiving, by the AP, a block acknowledgment (BA) in response to the BAR.

3. The method of claim 2, wherein transmitting, by the AP, an acknowledgment to the first STA in response to the received data, wherein the BAR is transmitted by the AP after the first acknowledgment is transmitted to the first STA.

4. The method of claim 1, wherein the first communication further comprises:
   transmitting, by the AP, a quality of service (QoS) Contention-Free (CF) Polling packet to the first STA to trigger the first STA to transmit a quality of service null data packet (QoS NDP) to the AP.

5. The method of claim 4, wherein the NDP is transmitted by the AP via the second communication while the AP receives the QoS NDP.

6. The method of claim 1, wherein:
   the second communication further comprises transmitting, by the AP, one or more other NDPs to the second STA;
   the one or more other NDPs are aggregated with the NDP; and
   the NDP and each of the one or more other NDPs have different modulation and coding scheme (MCS) levels.

7. The method of claim 6, wherein:
   an acknowledgement policy of a last of the one or more other NDPs is set to a normal acknowledgment while acknowledgement policies of the NDP and remaining NDPs of the one or more other NDPs are set to block acknowledgment; and
   the second communication further comprises receiving, by the AP, a block acknowledgment (BA) from the second STA in response to the last of the one or more other NDPs.

8. The method of claim 6, wherein:
   acknowledgement policies of the NDP and the one or more other NDPs are set to block acknowledgment;
   the second communication further comprises transmitting, by the AP, a block acknowledgment request (BAR) to the second STA and receiving, by the AP, a block acknowledgment (BA) in response to the BAR; and
   the first communication further comprises transmitting, by the AP, a null data packet to the first STA while receiving the BA from the second STA.

9. The method of claim 8, wherein:
   the data is received from the first STA while the AP transmits the NDP and the one or more other NDPs; and
   the BAR is transmitted to the second STA after the AP transmits the first acknowledgment to the first STA.

10. The method of claim 1, wherein:
    the second communication further comprises transmitting, by the AP, data to the second STA while receiving the data from the first STA; and
    the NDP is aggregated with the data transmitted to the second STA.

11. The method of claim 1, wherein the AP is configured to communicate in a full-duplex operation and the first and the second STAs are configured to communicate in a half-duplex operation.

12. An access point (AP) adapted to measure interference in joint communications between the AP and first and second communication stations (STAs), comprising:
    a transceiver configured to communicate with the first and the second STAs; and
    a controller coupled to the transceiver and is configured to:

establish a first communication between the AP and the first STA using the transceiver, the first communication comprising receiving data from the first STA and transmitting a first acknowledgment to the first STA to acknowledge the received data; and establish a second communication between the AP and the second STA using the transceiver to measure STA-to-STA inference between the first STA and the second STA, the second communication comprising transmitting a null data packet (NDP) to the second STA based on the first communication while the data is received from the first STA, and receiving a second acknowledgment from the second STA in response to the NDP while the first acknowledgment is received from the second STA.

13. The AP of claim 12, wherein the controller is further configured to:
transmit the NDP while receiving the data from the first STA;
transmit a block acknowledgment request (BAR) to the second STA via the second communication for the NDP; and
receive a block acknowledgment (BA) in response to the BAR.

14. The AP of claim 12, wherein the controller is further configured to:
transmit one or more other NDPs to the second STA via the second communication;
aggregate the one or more other NDPs with the NDP; and
set the NDP and each of the one or more other NDPs to have different modulation and coding scheme (MCS) levels.

15. The AP of claim 12, wherein:
the second communication further comprises transmitting, by the AP, data to the second STA while receiving the data from the first STA; and
the controller is further configured to aggregate the NDP with the data transmitted to the second STA.

16. An access point (AP) adapted to measure interference in joint communications between the AP and first and second communication stations (STAs), comprising:
a transceiver configured to communicate with the first and the second STAs; and
a controller coupled to the transceiver and is configured to:
establish a first communication between the AP and the first STA using the transceiver, the first communication comprising transmitting a quality of service (QoS) Contention-Free (CF) Polling packet to the first STA to trigger the first STA to transmit a quality of service null data packet (QoS NDP) to the AP; and
establish a second communication between the AP and the second STA using the transceiver, the second communication comprising transmitting a null data packet (NDP) to the second STA based on the first communication while the QoS NDP is received from the first STA to measure STA-to-STA inference between the first STA and the second STA.

17. The AP of claim 16, wherein the controller is further configured to:
receive an acknowledgment from the second STA in response to the NDP; and
transmit an acknowledgment to the first STA in response to the QoS NDP.

* * * * *